Figure 1:
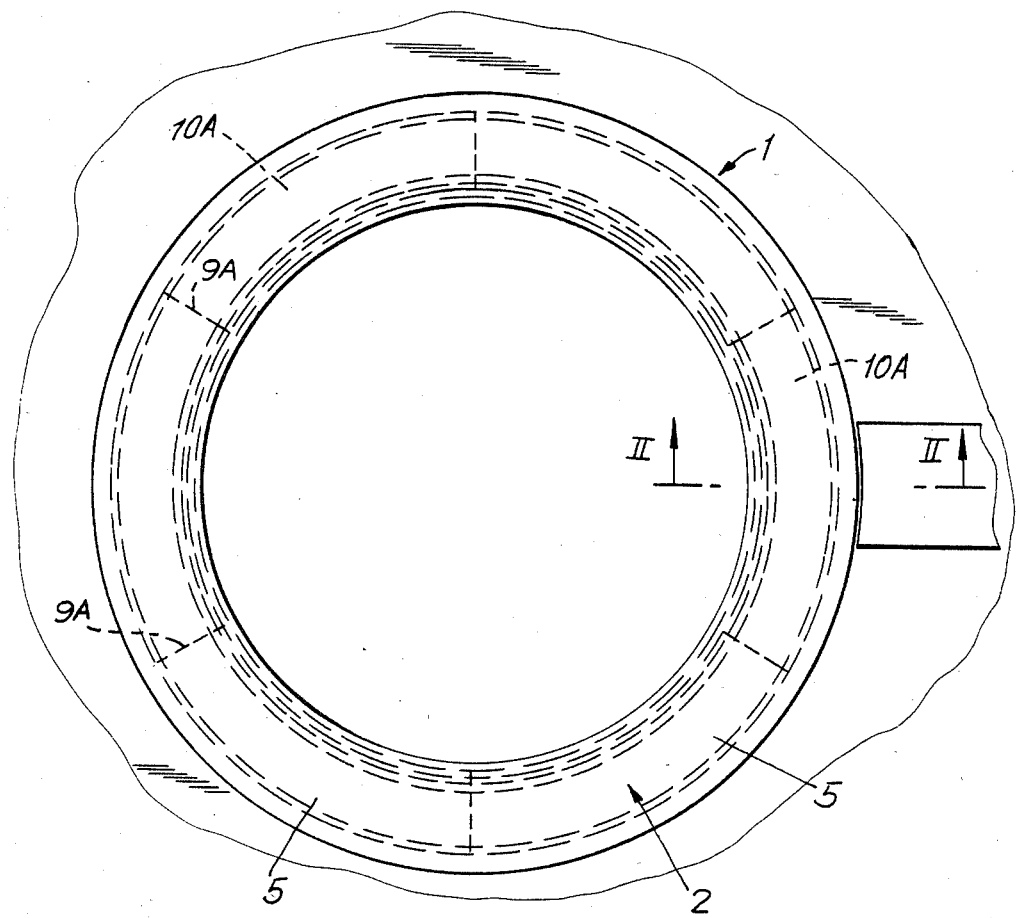

United States Patent [19]

Graham

[11] Patent Number: 4,566,405
[45] Date of Patent: Jan. 28, 1986

[54] ROTATABLE PLATFORMS

[76] Inventor: John A. Graham, 38 Hogan St., Hamilton, New Zealand

[21] Appl. No.: 475,097

[22] Filed: Mar. 14, 1983

[30] Foreign Application Priority Data

Mar. 12, 1982 [NZ] New Zealand .................. 200001
Sep. 21, 1982 [NZ] New Zealand .................. 201960
Nov. 18, 1982 [NZ] New Zealand .................. 202541

[51] Int. Cl.⁴ ................................................. A01K 1/12
[52] U.S. Cl. ................................................. 119/14.04
[58] Field of Search .................. 119/14.03, 14.04, 27

[56] References Cited

U.S. PATENT DOCUMENTS 3,880,120  4/1975  Shulick ......................... 119/14.04
4,227,486 10/1980  Kaufman et al. ................. 119/28

FOREIGN PATENT DOCUMENTS 129518  1/1978  German Democratic
                Rep. .................................. 119/14.03
146684  2/1981  German Democratic
                Rep. .................................. 119/14.03
505406  7/1976  U.S.S.R. .......................... 119/14.04

Primary Examiner—Robert P. Swiatek
Attorney, Agent, or Firm—Abelman Frayne Rezac & Schwab

[57] ABSTRACT

The present invention provides a rotatable platform which comprises a rotatable member (2) supported over a base (1) by a fluid (3) such as air or water. The rotatable member (2) has a loading deck (5). In one application when the platform is used for supporting animals (not shown) during milking the loading deck is provided with a plurality of bales defining stations for milking animals.

5 Claims, 11 Drawing Figures

ROTATABLE PLATFORMS

This invention relates to rotatable platforms.

Rotatable platforms are used for supporting animals during milking, the platforms being known as rotary milking platforms.

The present invention is of relevence and has application to rotary milking platforms, however, as will be appreciated from the ensuing description which is given by way of example in relation to the above application, a rotatable platform in accordance with the present invention has a broad and useful application to the conveying loads of any type for any purpose, other examples of possible uses being vehicle turn-arounds or domestic, industrial or commercial rotary conveyors.

Milking sheds for herd milking generally have milking stations or positions arranged in a herring-bone layout where animals are positioned in rows, the positioning of the cows being determined by bales defining the rows, or alternatively rotary milking platforms are used where animals to be milked are placed on a rotatable platform in other arrangements such that the various matters requiring attention during milking of the animal can be conveniently attended to. The rotary platforms may be circular and mount the cow bales or alternatively cow bales are fixed to a rotating annular platform.

For rotary platforms the rotating platform or part thereof is rotated about a central pivot and the platform is supported by support means and rotated by mechanical drivers. Support means for such rotary platforms are complicated and expensive and because of their size and/or the loads which the platforms need to support plus they need constant maintainance, they have not been universally adopted.

It is an object of the present invention to provide a rotatable platform incorporating improved fluid support means which will go at least some way to eliminate the disadvantages inherent in conventionally supported rotary platforms.

Further objects of the present invention will become apparent from the ensuing description which is given by way of example.

According to the broadest aspect of the present invention there is provided a rotatable platform comprising a base, and a rotating member having a loading deck arranged to be supported from said base by a fluid, said rotating member being rotatable with respect to the base whilst being supported from the base by said fluid.

Figure 2:
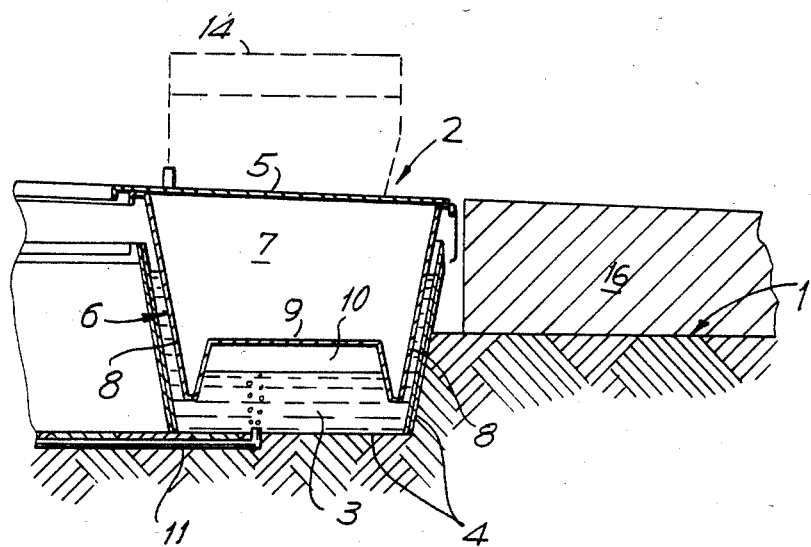
Figure 3:
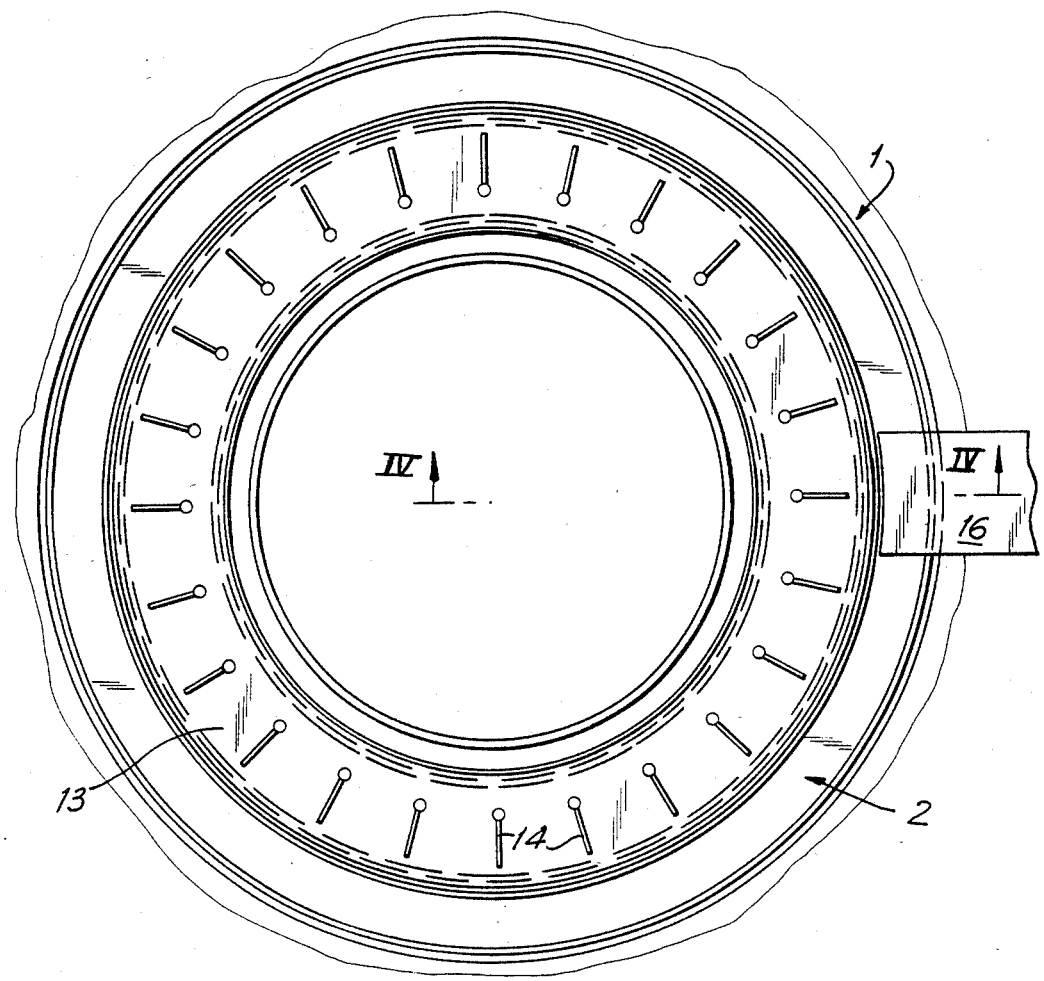
Figure 4:
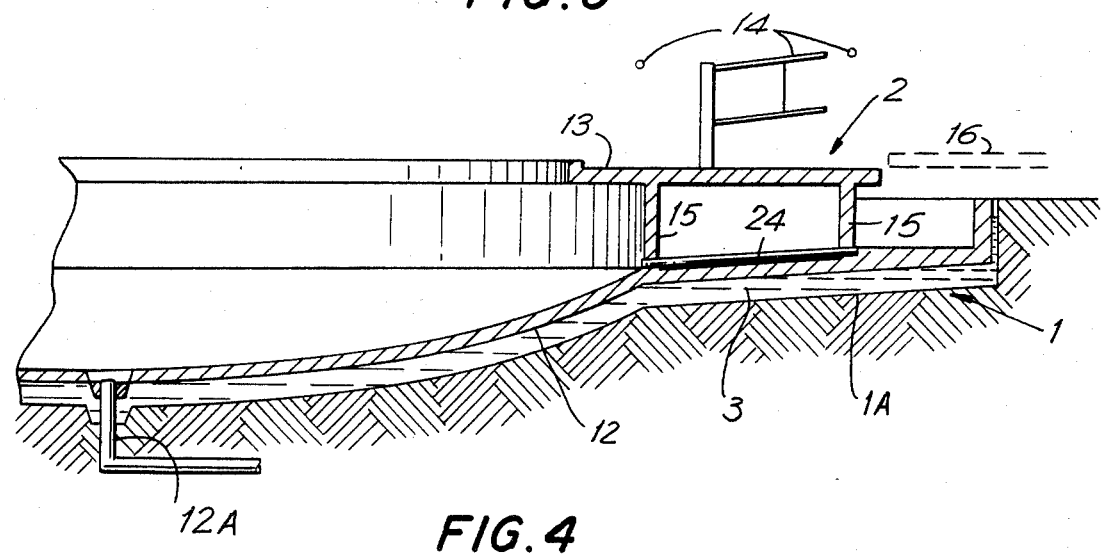
Figure 5:
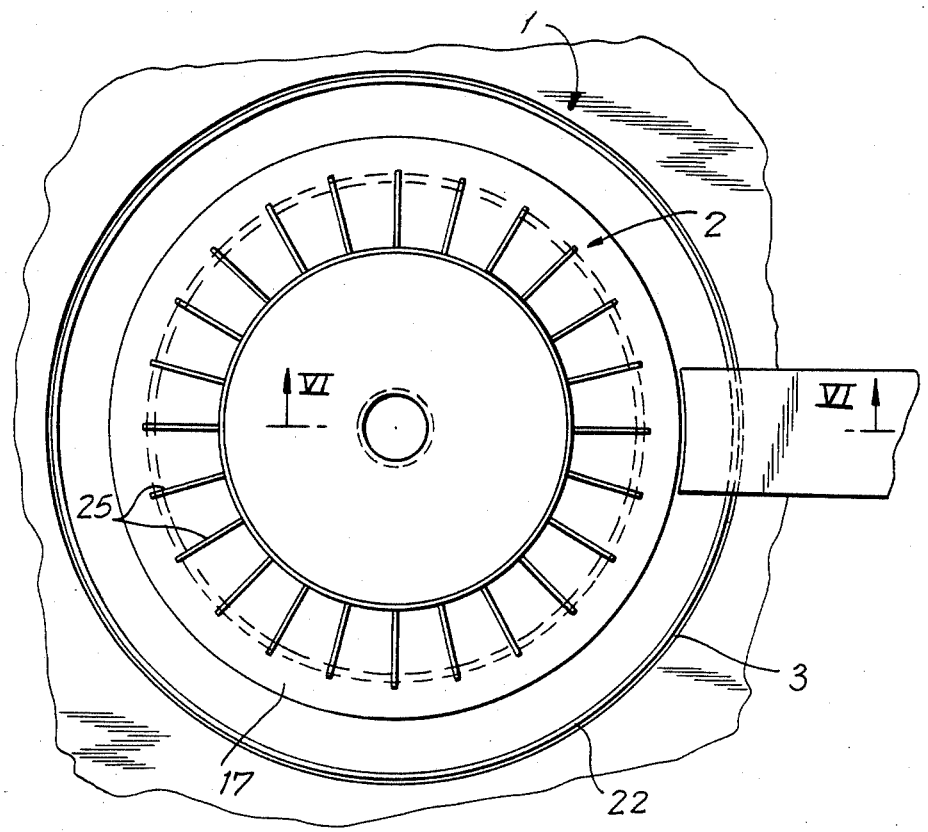
Figure 6:
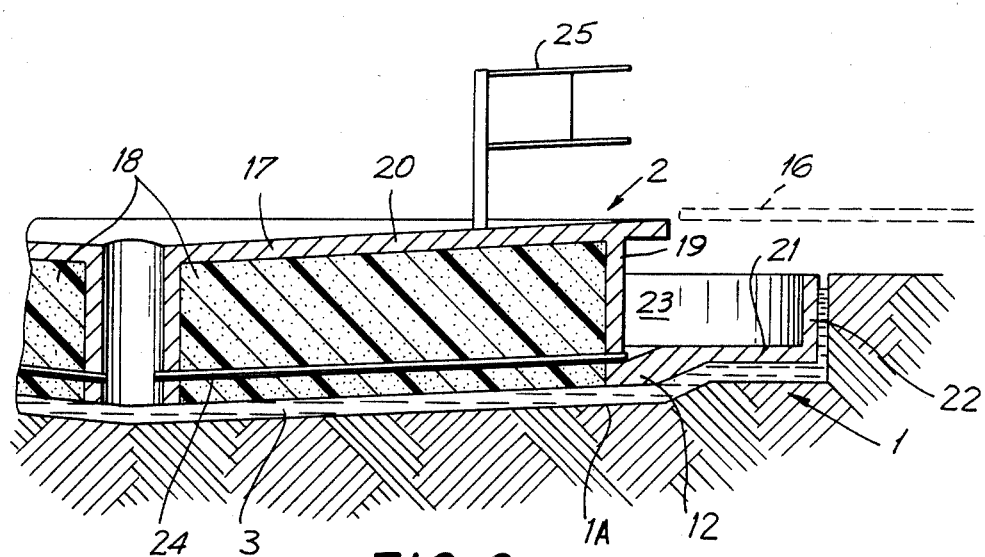
Figure 7:
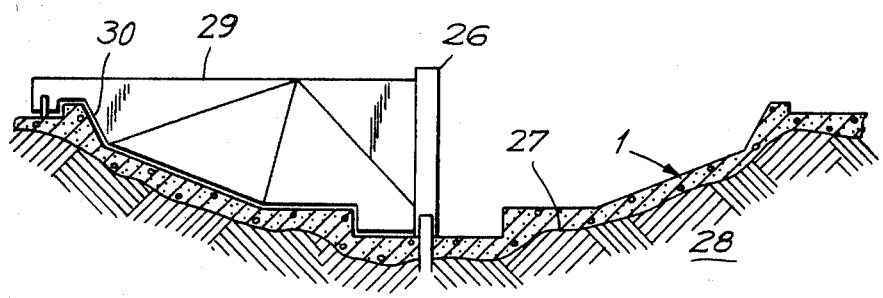

Aspects of the present invention will now be described by way of example only with reference to the accompanying drawings in which:

FIG. 1: is a plan view of a rotatable platform in accordance with one possible embodiment of the present invention, and FIG. 2: is a diagrammatic cross-section taken at II:II of FIG. 1, and FIG. 3: is a plan view of a rotatable platform in accordance with a further possible embodiment of the present invention, and FIG. 4: is a diagrammatic cross-section at IV:IV of FIG. 3, and FIG. 5: is a plan view of a rotatable platform in accordance with a further possible embodiment of the present invention, and FIG. 6: is a diagrammatic cross-sectional drawing showing one method by which a rotatable platform in accordance with FIGS. 3, 4, 5 and 6 can be formed, and FIG. 7 is a diagrammatic cross-sectional view showing the method by which a rotatable platform in accordance with the present invention can be formed.

Figure 11:
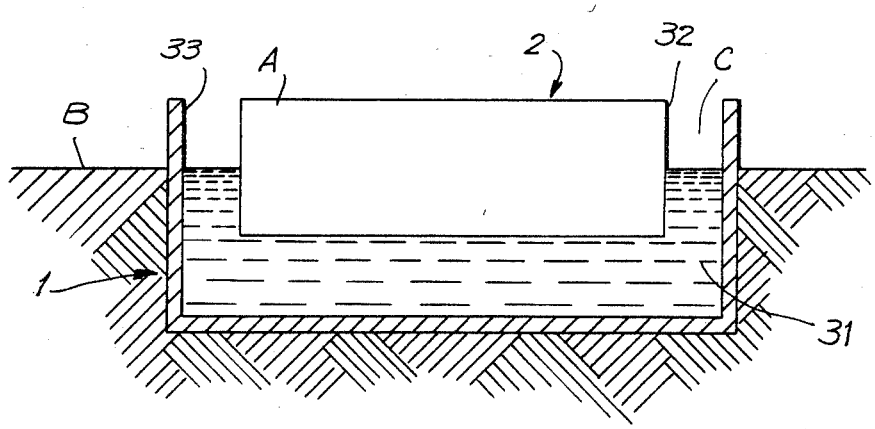
Figure 8:
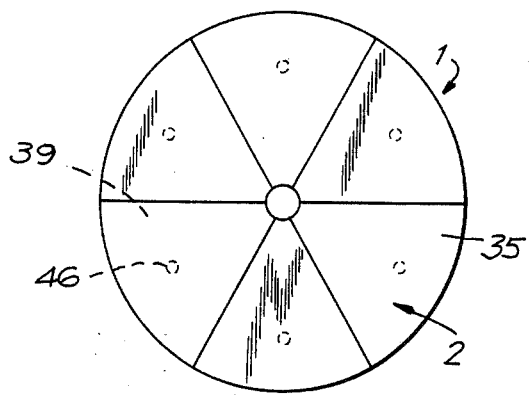
Figure 9:
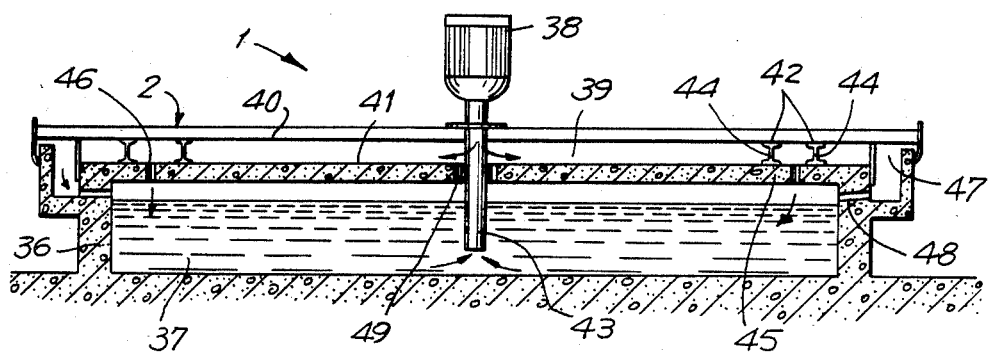
Figure 10:
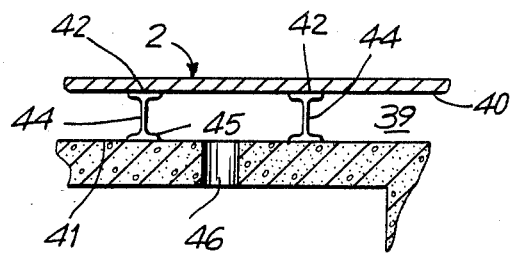

FIG. 8: is a plan view of a rotatable platform in accordance with another possible embodiment of the present invention, and FIG. 9: is a diagrammatic cross-section of the rotatable platform of FIG. 8, and FIG. 10: is a typical cross-section at the periphery of the rotatable platform of FIGS. 8 and 9, and, FIG. 11: is a diagrammatic explanatory drawing relating to floatation principles for rotatable platform constructions in accordance with embodiments of the present invention.

With respect to the drawings, a rotatable platform in accordance with the present invention comprises a base 1, and an annular rotatable member generally indicated by arrow 2 arranged to be supported from the base 1 by a fluid, said rotating member 2 being rotatable with respect to the base 1 whilst being supported by the base by the fluid 3 and defining a general pit area.

With respect to the embodiment of the present invention illustrated by FIGS. 1 and 2 of the drawings, the base 1 comprises a continuous trough 4 and the rotating member 2 has a loading deck 5 and a floatation section generally indicated by arrow 6 depending downwardly from said loading deck 5. The floatation section is disposed within the trough 4. In the embodiment illustrated the floatation section 6 is defined by a pair of spaced side walls 8 depending downwardly from the loading deck 5 and a bottom member 9 which defines an air trap 10 in the trough with the liquid 3, the base also including a plurality of air feed outlets 11 arranged to disperse air into the air trap 10 via the liquid above the base (see bubbles indicated on FIG. 2). Where the air trap 10 is provided this can be segmented by a plurality of divider walls 9A dividing the air trap into say, six segmented compartments 10A. Each segmented compartment is provided with its own outlet 11 which receives air under pressure from pumping means (not shown).

In a milking installation the trough 4 conveniently provides a water reservoir for pumps which may be associated with the milking plant and further provides a silencer exhaust for a vacuum plant of the milking plant.

Simple mechanical valves (not shown) for example, large ballcock control valves can control air being exhausted from the segmented air traps 10A and when one side of the rotating member 2 moves down under load the valves closest to the point of loading close allowing incoming air to build up pressure and displace more water. Conversely, when one side moves up air is released producing displacement.

The base 1 can be formed in a mouldable material such as concrete formed on site, and the rotating member 2 can be fabricated wholly of partially from plastics or any other suitable material or combination of materials.

Where the rotatable platform is used for supporting milking animals, bales 14 and a ramp 16 to the rotatable member 2 are provided.

With respect to the embodiments of the present invention illustrated by FIGS. 3 and 4 and 5 and 6 of the drawings, in each case the base 1 comprises a substantially circular trough 1A and the rotating member 2 is a pontoon having a base 12 shaped to be complementary with the surface shape of trough 1A.

In the case of the embodiment of the present invention illustrated by FIGS. 3 and 4 of the drawings, the loading deck 13 produces a central pit area and is a substantially annular deck which overlies the outer surfaces of the pontoon and where the rotatable platform is used for supporting a plurality of milking animals (not shown) the loading deck 13 mounts bales 14. The loading deck 13 is supported from its base 12 by supports 15 which can be in the form of spaced piles (not shown) or a nib wall (as shown). Where the supports 15 are in the form of a nib wall a water run-off pipe 24 can be provided for access to the lower central parts of the rotatable member 2 where there is a sump 12A.

In the case of the embodiment illustrated by FIGS. 5 and 6 of the drawings the base 12 of the pontoon supports a loading deck 17 which covers most of the base 12 of the pontoon. The pontoon can be constructed about a substantially annular floatation material piece 18 which is covered by a mouldable material to form sides 19 and a top 20, and the outer parts 21 of the base 12. Between the sides 19 of the loading deck 17 and the sides 22 of the base 12, a pit area 23 is formed which can have a drain 24 for water run-off to the centre of the pontoon from where accumulated water can be pumped or otherwise cleared and where the rotatable platform is used for supporting milking animals the deck 17 can mount bales 25.

With respect to FIG. 7 of the drawings, the base 1 for the rotatable platforms and the rotating member 2 may be formed in mouldable material such as concrete by a method of construction which comprises the steps of mounting a central pivot support means 26 in a pit 27 formed in a ground surface 28 and using a rotatable screed 29 having a shaped surface forming member 30 which is supported centrally with respect to the pivot support means 26. A mouldable material such as concrete is placed over the pit 27 and the mouldable material is shaped with the screed 29 to form a base 1. Once the base 1 has been formed and has set, a material such as plastics sheet (not shown) can be applied over the base for the purpose of ensuring that further mouldable material applied thereto will not adhere to the base, and a rotating member 2 (see FIGS. 2, 3, 4, and 5) formed directly on site on the base. When the construction of the rotating member is complete and the materials have set, the rotating member and the base can be separated and the trough filled with water or another liquid.

With respect to FIG. 11 of the drawings the rotatable platforms illustrated by way of example with reference to FIGS. 1, 2, 3, 4, 5, and 6 are all designed in accordance with similar floatation principles. In each case there is a fluid sink 31 between the sides 32 of the rotating member 2 and the sides 33 of the base 1. The rotatable platforms designed are such that a plan area A of the rotating member 2 on a plane B on the liquid surface is greater than the area C of the free surface of the liquid within the fluid sink 31. An alternative design criteria may be that the plan area A of the rotating member 2 on the plane B on the liquid surface is less or equal to the area C of the free surface of the liquid within the fluid sink, although a rotatable platform constructed in accordance with this latter principle is likely to be somewhat unstable under load.

An important design feature of the present invention is that one unit of vertical displacement of the rotating member produces a number of units of rise in the free liquid surface in the fluid sink 31. Hence the vertical settlement of the rotating member when loaded is minimised because the effective liquid displaced has been magnified by the above area ratios causing the liquid surface to rise around the rotatable member by a number of times greater than its downward displacement.

With respect to the embodiment of the present invention illustrated by FIGS. 8, 9, and 10 of the drawings the rotating member 2 which is substantially circular is formed in joinable segments 35. The fluid which can be stored in a reservoir 37 formed inside the base 36 and is transferred by a pump 38 into fluid chambers 39 formed between the under surface 40 of the rotating member 2, the top surface 41 of the base 36 and sealing means indicated by arrow 42 at the periphery of the base 36.

The pump has an inlet conduit 43 which extends into the reservoir 37 and fluid pumped therefrom is expressed by the pump into the fluid chambers 39 (see path arrows of FIG. 9). The rotating member 2 is thus supported by the fluid.

The sealing means 42 comprises a pair of I-shaped sealing strips 44 which are fixed to surface 40 of the rotating member and pressure inside the fluid chambers 39 causes lower flanges 45 thereof to seal against the surface 41. Fluid which may have escaped from beneath the inside sealing strip 44 can re-enter the reservoir 37 via drain holes 46 and fluid which escapes the further outer sealing strip beyond the drain holes 46 is collected in a sump 47 and returned to the reservoir 37 via apertures 48. A sealing bearing or rotary gland 49 surrounds the conduit 43 to prevent leakage.

It is to be appreciated that a platform supported by a fluid under pressure could be supported by a gas such as air, similar construction details (excepting for the reservoir) being used.

In all cases the rotating members 2 can be driven (rotated) by driving means (not shown) such as a hydraulic or air motor through driving means such as rack and pinion gears or the motors may drive a wheel which contacts with the sides of the rotatable members.

I claim:

1. A rotatable platform comprising a base and rotating member having a loading deck arranged to be supported from the base by a fluid, said rotating member being rotatable with respect to the base whilst being supported above the base by said fluid wherein the platform is supported by fluid pressure developed by mechanical means and the base is a raised disk-like member and the loading deck is arranged to be supported over the base, there being provided sealing means at the periphery of said disk-like member such that fluid chambers are defined between the upper surface of the disk-like member and the lower surface of said loading deck and sealing means and pumping means is arranged to supply fluid under pressure to said fluid chambers.

2. A rotatable platform comprising a base and a rotatable member having a loading deck, said rotatable member being arranged to be supported above the base by a liquid and being rotatable with respect to the base whilst being supported above the base by said liquid, wherein the base is a substantially circular trough having side walls and the rotatable member is a pontoon having a bottom wall and side walls extending upwardly from said bottom wall, said pontoon having a raised loading deck which is spaced from the side walls of the pontoon such that there is provided a pit area between the side walls and the raised loading deck within which an attendant can be positioned, there being a liquid sink between the side walls of the pontoon and the side walls of the base, the arrangement and construction being such that the plan area of the pontoon on the plane of the liquid surface is greater than the area of the free surface of the liquid within the liquid sink.

3. A rotatable platform comprising a base and a rotatable member positioned on said base and having a loading deck, said rotatable member being arranged to be supported above the base by a liquid and being rotatable with respect to the base whilst being supported above the base by said liquid, wherein the base is a substantially circular trough having side walls and the rotatable member is a pontoon having a bottom wall and side walls extending upwardly from said bottom wall, said pontoon having a loading deck supported from the bottom wall and which provides a pit area at the center of said loading deck within which an attendant can be positioned, there being a fluid sink between the side walls of the base and the side walls of the pontoon, the arrangement and construction being such that the plan area of the pontoon on the plane of the liquid surface is greater than the area of the free surface of the liquid within the liquid sink.

4. A rotatable platform comprising a base and a rotatable member positioned within said base and having a loading deck, said rotatable member being arranged to be supported above the base by a liquid and being rotatable with respect to the base whilst being supported above the base by said liquid, there being a fluid sink between sides of the rotatable member and sides of the base, wherein the base comprises a continuous trough and the rotatable member has a loading deck and a floatation section depending downwardly from the loading deck, said floatation section being disposed within said trough and including a segmented air trap submerged in said liquid, and means for delivering air under pressure to said segmented air trap.

5. A rotatable member as claimed in claim 4, wherein the floatation section is defined by a pair of spaced side walls depending downwardly from said loading deck, and a bottom member, said bottom member defining an air trap within the liquid in the trough, said base including a plurality of air feed outlets arranged to disperse pressurized air into said segmented air trap.

* * * * *